US011659473B2

(12) United States Patent
Tian et al.

(10) Patent No.: US 11,659,473 B2
(45) Date of Patent: May 23, 2023

(54) ACCESS METHOD AND APPARATUS FOR ACCESS POINT, ELECTRONIC DEVICE, AND STORAGE MEDIUM

(71) Applicant: BEIJING XIAOMI MOBILE SOFTWARE CO., LTD., Beijing (CN)

(72) Inventors: Yong Tian, Beijing (CN); Hanbiao Sun, Beijing (CN); Liming Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 56 days.

(21) Appl. No.: 17/354,933

(22) Filed: Jun. 22, 2021

(65) Prior Publication Data

US 2022/0303870 A1 Sep. 22, 2022

(30) Foreign Application Priority Data

Mar. 16, 2021 (CN) .......................... 202110282728.8

(51) Int. Cl.
*H04W 48/02* (2009.01)
*H04W 12/55* (2021.01)
(Continued)

(52) U.S. Cl.
CPC ........... *H04W 48/02* (2013.01); *H04W 12/55* (2021.01); *H04W 48/20* (2013.01); *H04W 88/08* (2013.01);
(Continued)

(58) Field of Classification Search
CPC ..... H04W 48/02; H04W 12/55; H04W 48/20; H04W 88/08; H04W 12/009; H04W 76/14; H04W 84/18
See application file for complete search history.

(56) References Cited

U.S. PATENT DOCUMENTS 9,648,548 B1 * 5/2017 Gan .......................... H04L 67/12
2017/0135033 A1 * 5/2017 Vecera .................. H04W 48/06

FOREIGN PATENT DOCUMENTS

CN 102065509 A1 5/2011
CN 102511151 A1 6/2012
(Continued)

OTHER PUBLICATIONS

3GPP TSG RAN WG2 Meeting #112e R2-2009201, Electronic meeting, Nov. 2-13, 2020, Agenda Item: 8.4.3, Source: Intel Corporation, Title: Enhancements to establish efficient topologies and backhaul failure recovery, Document for: Discussion and Decision, (10p).
(Continued)

*Primary Examiner* — Said M Elnoubi
(74) *Attorney, Agent, or Firm* — Arch & Lake LLP

(57) ABSTRACT

An access method is provided for an access point (AP). The method is applied to a first AP, and includes: responsive to determining that an access restriction rule allows a second AP to access the first AP, interface configuration information of the first AP is determined according to the access restriction rule; and an access interface of the first AP is configured according to the interface configuration information, where the access interface is configured for the second AP to access the first AP in response to determining that the access interface is configured to allow access.

20 Claims, 8 Drawing Sheets

(51) Int. Cl.
　　　*H04W 48/20*　　　(2009.01)
　　　*H04W 88/08*　　　(2009.01)
　　　*H04W 76/14*　　　(2018.01)
　　　*H04W 12/00*　　　(2021.01)
　　　*H04W 84/18*　　　(2009.01)

(52) U.S. Cl.
　　　CPC .......... *H04W 12/009* (2019.01); *H04W 76/14* (2018.02); *H04W 84/18* (2013.01)

(56) References Cited

FOREIGN PATENT DOCUMENTS

| CN | 102857258 | A1 | | 1/2013 |
|---|---|---|---|---|
| CN | 105101349 | A | * | 11/2015 |
| CN | 107548101 | A1 | | 1/2018 |
| CN | 108574975 | A1 | | 9/2018 |
| CN | 111263379 | A1 | | 6/2020 |

OTHER PUBLICATIONS

Yuzhen Ma et al: "Optimisation of Wi-Fi Mesh Network for small cell backhaul", 2014 International Workshop on High Mobility Wireless Communications, IEEE Nov. 1, 2014 (Nov. 1, 2014), pp. 89-93, XP032700243, DOI: 10.1109/HMWC.2014.7000220, [retrieved on Dec. 30, 2014], (5p).
3GPP TSG-RAN WG2 NR AH1807 Meeting R2-1809864, Montreal, Canada, Jul. 2-6, 2018, Title: Discussion on IAB node access and resource allocation, Source:vivo, Agenda item: 11.1, Document for: Discussion and Decision, (3p).
European Search Report in the European Application No. 21182087.3, dated Jan. 5, 2022, (13p).
CNOA of Application No. 202110282728.8, date on Jun. 22, 2022 with English translation,(15p).

* cited by examiner

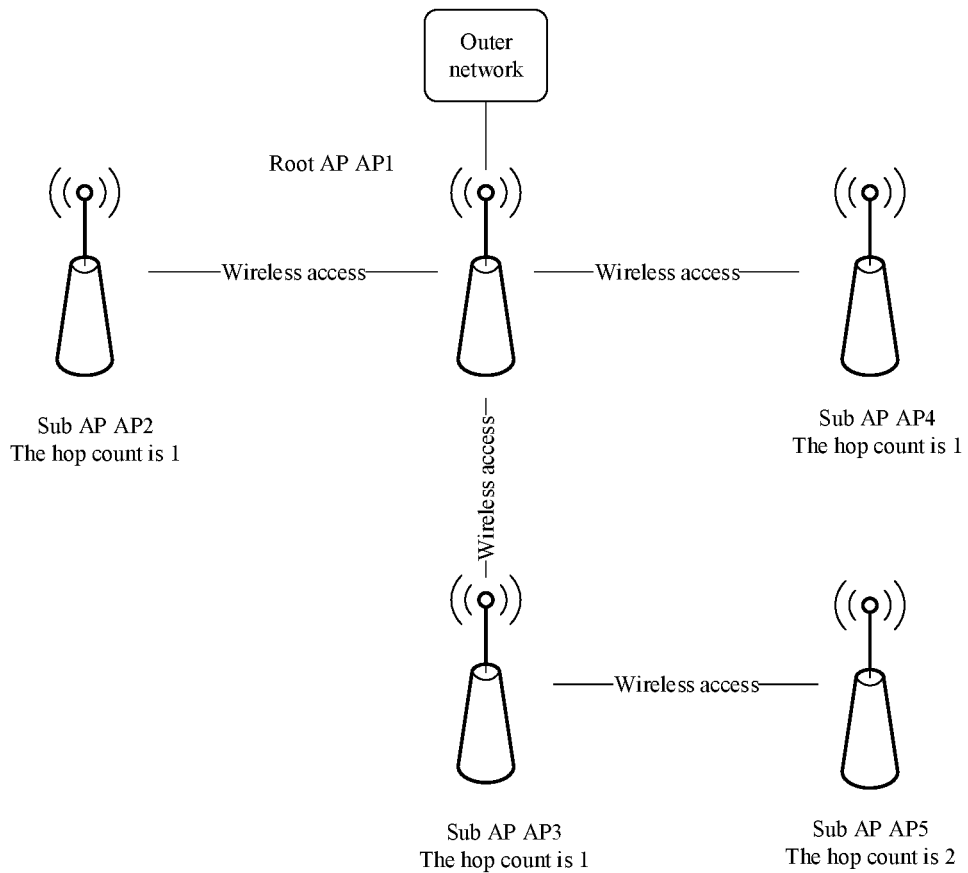

FIG. 1

S21: Responsive to that an access restriction rule allows a second AP to access a first AP, interface configuration information of the first AP is determined according to the access restriction rule S22: An access interface of the first AP is configured according to the interface configuration information, the access interface being configured for the second AP to access the first AP when the access interface is configured to allow access

FIG. 2

ACCESS METHOD AND APPARATUS FOR ACCESS POINT, ELECTRONIC DEVICE, AND STORAGE MEDIUM

CROSS-REFERENCE TO RELATED APPLICATION

This application is filed based upon and claims priority to Chinese patent application No. 202110282728.8, filed on Mar. 16, 2021, the entire content of which is incorporated herein by reference for all purposes.

TECHNICAL FIELD

The disclosure generally relates, but not limited, to the technical field of wireless communications, and more particularly, to an access method and apparatus for an access point (AP), an electronic device, and a storage medium.

BACKGROUND

In a wireless communication technology, for wireless communication in a large house or a multistory building, a signal of a single router cannot cover everywhere in the large house or the multistory building, and a solution to extension of the coverage of the signal is needed. Before a Mesh technology, a signal coverage is extended using a solution such as a power line communication modem and wireless relaying, but there are still defects of poor network speed experience, complex configuration, high difficulties in wiring, and the like. Mesh networking is extensively applied rapidly due to advantages of synchronous configuration, network self-repairing, seamless roaming, and the like.

In a mesh network, a wireless rate may be affected by a factor such as contention for a wireless channel, and the increase of a hop count or the number of accessing Mesh devices may reduce the wireless performance.

SUMMARY

According to a first aspect of the disclosure, an access method for an AP is provided. The method may include that a first AP determines, responsive to determining that an access restriction rule allows a second AP to access the first AP, interface configuration information of the first AP according to the access restriction rule. Further, the first AP configures an access interface of the first AP according to the interface configuration information, where the access interface is configured for the second AP to access the first AP in response to determining that the access interface is configured to allow access.

According to a second aspect of the disclosure, an access apparatus for an AP is provided. The apparatus includes a processor and a memory for storing instructions executable by the processor. Further, the processor is configured to: responsive to determining that an access restriction rule allows a second AP to access the first AP, determine interface configuration information of the first AP according to the access restriction rule. The processor is further configured to configure an access interface of the first AP according to the interface configuration information, where the access interface is configured for the second AP to access the first AP in response to determining that the access interface is configured to allow access.

It is to be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 1 is a schematic diagram illustrating a wireless communication system, according to an example.

FIG. 2 is a flow chart showing an access method for an AP, according to an example.

DETAILED DESCRIPTION

Figure 3:
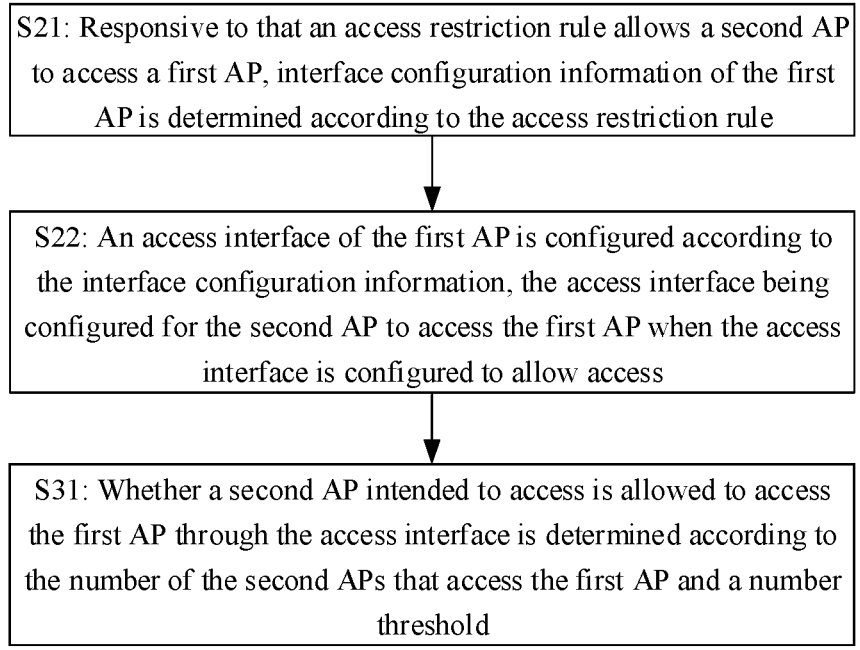
FIG. 3 is a flow chart showing an access method for an AP, according to an example.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure as recited in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

For making it convenient for those skilled in the art to understand, multiple implementation modes are listed in the embodiments of the disclosure to describe the technical solutions of the embodiments of the disclosure clearly. Of course, those skilled in the art can understood that multiple embodiments provided in the embodiments of the disclosure can be executed independently, or can be combined with methods of the other embodiments in the embodiments of the disclosure for execution together, or may be executed independently or after combined with some methods in other related technologies. No limits are made thereto in the embodiments of the disclosure.

For conveniently understanding any embodiments of the disclosure, a mesh network is described at first.

Referring to FIG. 1, in an example, a mesh network includes an outer network and five APs. The five APs are AP1, AP2, AP3, AP4 and AP5 respectively. Ap1 is a root AP, and AP2, AP3, AP4 and AP5 are sub APs. Hop counts of AP2, AP3 and AP4 are 1, and a hop count of AP5 is 2.

In the mesh network, the following performance of two aspects needs to be improved. First, the wireless performance of a mesh device is improved, namely the condition that the wireless network performance of the mesh network is reduced by an excessively large number of APs that access a certain AP in the mesh network or an excessively large hop count of an AP in the mesh network is reduced. Second, the recovery efficiency of a topological network is improved, namely a disconnected AP may avoid an AP that has been accessed by a maximum number of APs when selecting an AP for access, and the topology recovery efficiency may be improved.

In an embodiment, the mesh network restricts the number of connections allowed by each AP and a maximum hop count of the mesh network. Here, a hop count indicates a distance between a certain network device (for example, an AP) in the mesh network and a device at an exit of the network. Here, the number of connections of an AP in the mesh network refers to the number of subordinate APs of the AP. In FIG. 1, each AP in the mesh network allows at most three APs to access, and the maximum hop count allowed in the mesh network is 2.

As illustrated in FIG. 2, an embodiment provides an access method for an AP. The method is applied to a first AP, and includes the following operations.

At S21, responsive to that an access restriction rule allows a second AP to access the first AP, interface configuration information of the first AP is determined according to the access restriction rule.

At S22, an access interface of the first AP is configured according to the interface configuration information, the access interface being configured for the second AP to access the first AP when the access interface is configured to allow access.

Here, at least one of the first AP or the second AP may be an AP in a mesh network. Here, the AP may be a router. The second AP may access the first AP to establish a connection with an outer network. It is to be noted that the second AP may also be connected with or coupled to another AP. For example, the second AP may also be connected with a third AP, a fourth AP and the like.

Here, the first AP may be connected with multiple second APs. Each first AP and/or each second AP may be connected with at least one terminal. Here, the terminal may be, but not limited to, a computer, a mobile phone, a wearable device, a vehicle-mounted terminal, a road side unit (RSU), a smart home terminal, an industrial sensing device, and/or a medical device, etc.

In an embodiment, the first AP is a root router of a mesh network, the second AP is a sub router of the mesh network, and the root router is connected with at least one sub router; or, the first AP is an intermediate sub router of the mesh network, the second AP is an end router of the mesh network, and the intermediate sub router is connected with at least one end router.

In the related art, during networking of the mesh network, the wireless performance is likely to be reduced under the condition that a hop count is too large or the number of accessing mesh devices is too large, and in addition, an excessively complex network topology may affect the topology recovery efficiency. For overcoming the foregoing defects brought during networking of the mesh network, during networking of the mesh network, on one hand, in the related art, a total hop count of routers connected to/with a main router may be directly restricted in a manner of unification in the whole network, and in such case, since the hop count of the whole network is fixed, even though the main router in mesh routers has a capability greater than the hop count, no more routers may not be connected to improve the connectivity of the network, so that the capability of the mesh network is restricted. On the other hand, in the related art, when the routers of the mesh network are deployed, the routers may be deployed according to a fixed hop count, so the number of the routers that are deployed may not be regulated flexibly.

In the embodiment of the disclosure, the interface configuration information of the first AP is determined according to the access restriction rule responsive to that the access restriction rule allows the second AP to access the first AP, so that the access restriction rule may be determined flexibly according to the capability of the mesh network to ensure that the access restriction rule is adapted to the capability of the mesh network, and the interface configuration information may be determined according to the access restriction rule. The access interface of the first AP is configured according to the interface configuration information, the access interface being configured for the second AP to access the first AP when the access interface is configured to allow access. In such a manner, the access interface of the first AP may be configured flexibly using the configuration information determined according to the access restriction rule. Compared with a manner of deploying the mesh network according to a fixed hop count and configuring the access interface of the first AP not using the interface configuration information obtained according to the access restriction rule determined according to the capability of the mesh network, this manner has the advantage that the access interface may be configured to forbid or allow the second AP to access the first AP through the access interface when the access restriction rule allows the second AP to access the first AP, so that the mesh network may independently restrict the number of second APs that access the first AP to implement flexible configuration when the second AP accesses the first AP, and the condition that the wireless performance is reduced by a large number of APs in the network or the condition of low topology recovery efficiency caused by a complex topology may be reduced.

In an embodiment, the mesh network indicates a number threshold of the number of APs that may be connected to each AP and/or a hop count threshold of a hop count of the AP. In an embodiment, the access restriction rule indicates the number threshold of the number of APs that may be connected to each AP and the hop count threshold of the hop count of the AP. For example, the access restriction rule indicates that the number of second APs that may be connected to each first AP is at most 3 and that a maximum hop count of the first AP is 3. It is to be noted that the number of other APs that access the first AP cannot exceed the number threshold. The hop count threshold of the hop count of the AP may be the maximum hop count of the mesh network, and the hop count of the AP cannot exceed the maximum hop count of the mesh network.

In an embodiment, a hop count of an AP connected with a root AP is 1, a hop count of an AP connected with the AP of which the hop count is 1 is 2, a hop count of an AP connected with the AP of which the hop count is 2 is 3, and so on. Here, multiple APs may correspond to the same hop count. For example, if both AP 1 and AP 2 are connected with the root AP, hop counts of AP 1 and AP 2 are both 1. Here, the root AP is an AP directly connected with the outer network.

In an embodiment, the first AP receives information of the access restriction rule from a main AP or the root AP, and the first AP determines the interface configuration information of the first AP according to the access restriction rule responsive to that the information of the access restriction rule received by the first AP indicates that the second AP is allowed to access the first AP.

In an embodiment, the information of the access restriction rule is pre-configured in the first AP, and the first AP determines the interface configuration information of the first AP according to the access restriction rule responsive to that the pre-configured information of the access restriction rule allows the second AP to access the first AP.

In an embodiment, the interface configuration information of the first AP at least indicates a number threshold of the number of second APs that may be connected to the first AP and/or a hop count threshold of a hop count of the second AP. In an embodiment, responsive to that power of the first AP is greater than a power threshold, the number threshold is greater than a first value; and responsive to that the power of the first AP is less than the power threshold, the number threshold is less than the first value. In an embodiment, responsive to that the power of the first AP is greater than the power threshold, the hop count threshold is greater than a second value; and responsive to that the power of the first AP is less than the power threshold, the hop count threshold is less than the second value. Here, the hop count threshold of the hop count of the second AP may be the maximum hop count of the mesh network.

In an embodiment, the interface configuration information indicates a hop count threshold of a hop count of the first AP. In an embodiment, the first AP allows a second AP intended to access to access through the access interface responsive to that the hop count of the first AP is less than the hop count threshold; and the first AP forbids the second AP intended to access to access through the access interface responsive to that the hop count of the first AP is equal to the hop count threshold.

In an embodiment, the interface configuration information indicates the number threshold of the number of the second APs that may be connected to the first AP. In an embodiment, the first AP allows the second AP intended to access to access through the access interface responsive to that the number of second APs that are connected to the first AP is less than the number threshold; and the access interface of the first AP forbids the second AP intended to access to access through the access interface responsive to that the number of the second APs that are connected to the first AP is equal to the number threshold.

In an embodiment, the number of the second APs that are connected to the first AP is equal to the number threshold at a first moment; and at a second moment, at least one of the second APs is disconnected from the first AP, and the number of the second APs that are connected to the first AP is less than the number threshold. The first AP allows the second AP intended to access to access through the access interface responsive to that the number of the second APs that are connected to the first AP is less than the number threshold.

In an embodiment, the second AP intended to access may access the first AP through the access interface responsive to that the second AP is allowed to access through the access interface, and the second AP intended to access may not access the first AP through the access interface responsive to that the second AP is forbidden to access through the access interface.

In an embodiment, the access interface of the first AP is enabled or activated responsive to that the second AP is allowed to access through the access interface, and the access interface of the first AP is disabled or deactivated responsive to that the second AP is forbidden to access through the access interface.

In an embodiment, the second AP intended to access may send the first AP a request of requesting for access responsive to that the second AP is allowed to access through the access interface; and the second AP intended to access does not send the first AP the request of requesting for access responsive to that the second AP is forbidden to access through the access interface.

In an embodiment, the first AP receives the information of the access restriction rule from the main AP, and the access restriction rule indicates that the second AP is allowed to access the first AP. The second AP determines the interface configuration information of the first AP according to the access restriction rule. The second AP configures the access interface of the first AP according to the interface configuration information, and the configuration information indicates the number threshold of the number of the second APs that may be connected to the first AP and/or the hop count threshold of the hop count of the second AP. The first AP enables or activates the access interface responsive to that the hop count of the second AP is less than the hop count threshold. The second AP sends a request message for accessing the first AP to the first AP. The first AP allows the second AP intended to access to access the first AP through the access interface of the first AP responsive to that the request message is received and the number of the second APs that access the first AP is less than the number threshold. The second AP intended to access accesses the first AP through the access interface.

In the embodiment of the disclosure, the interface configuration information of the first AP is determined according to the access restriction rule responsive to that the access restriction rule allows the second AP to access the first AP, so that the interface configuration information may be determined according to the access restriction rule. The access interface of the first AP is configured according to the interface configuration information, and the access interface is configured for the second AP to access the first AP when the access interface is configured to allow access. In such a manner, the access interface of the first AP may be configured using the configuration information determined according to the access restriction rule. Compared with a manner of configuring the access interface of the first AP not using the interface configuration information determined according to the access restriction rule, this manner has the advantage that the access interface may be configured to forbid or allow the second AP to access the first AP through the access interface when the access restriction rule allows the second AP to access the first AP, so that the number of the second APs that access the first AP may be restricted, and the condition that the wireless performance is reduced by a large number of APs in a network may be reduced.

In an embodiment, the interface configuration information includes at least one of: first interface configuration information, indicating a number threshold of the number of second APs that are allowed to access the first AP using the access interface; or second interface configuration information, indicating a hop count threshold of a hop count of the AP.

In an embodiment, the first AP may be connected with multiple second APs, and the number threshold is an upper limit value of the number of the multiple second APs that may be connected to the first AP. For example, if the first AP may be connected with N second APs, the number threshold is N, N being a positive integer greater than 1.

In an embodiment, the first AP allows the second AP intended to access to access the first AP through the access interface responsive to that the number of the second APs that are connected to the first AP is less than the number threshold. The first AP forbids the second AP intended to access to access the first AP through the access interface responsive to that the number of the second APs that are connected to the first AP is equal to the number threshold.

In an embodiment, the hop count threshold may be the maximum hop count in the mesh network. For example, if the maximum hop count in the mesh network is N, the hop count threshold is N.

In an embodiment, the first AP activates the access interface of the first AP responsive to that the hop count of the first AP is less than the hop count threshold, and in such case, the second AP intended to access may access the first AP through the access interface. The first AP deactivates the access interface of the first AP responsive to that the hop count of the first AP is equal to the hop count threshold, and in such case, the second AP intended to access may not access the first AP through the access interface.

It is to be noted that those skilled in the art can understand that the method provided in the embodiment of the disclosure may be executed independently, or may be executed together with some methods in the embodiments of the disclosure or some methods in the related art.

As illustrated in FIG. 3, an embodiment provides an access method for an AP. The method is applied to a first AP, and includes the following operation.

At S31, whether a second AP intended to access is allowed to access the first AP through the access interface is determined according to the number of the second APs that access the first AP and a number threshold.

In an embodiment, the access restriction rule sent by the root AP is received, or information of the access restriction rule is preset. The information of the access restriction rule indicates the number threshold.

In an embodiment, the first AP may be connected with multiple second APs, and the number threshold is an upper limit value of the number of the multiple second APs that may be connected to the first AP. For example, if the first AP may be connected with N second APs, the number threshold is N, N being a positive integer greater than 1.

In an embodiment, the first AP activates the access interface, the first AP receives the request message of requesting for accessing the first AP from the second AP intended to access, and the first AP allows the second AP intended to access to access the first AP through the access interface responsive to that the number of the second APs that are connected to the first AP is less than the number threshold. In such case, the second AP intended to access may access the first AP through the access interface.

In an embodiment, the first AP activates the access interface, the first AP receives the request message of requesting for accessing the first AP from the second AP intended to access, and the first AP forbids the second AP intended to access to access the first AP through the access interface responsive to that the number of the second APs that are connected to the first AP is equal to the number threshold. In such case, the second AP intended to access may not access the first AP through the access interface.

It is to be noted that those skilled in the art can understand that the method provided in the embodiment of the disclosure may be executed independently, or may be executed together with some methods in the embodiments of the disclosure or some methods in the related art.

Figure 4:
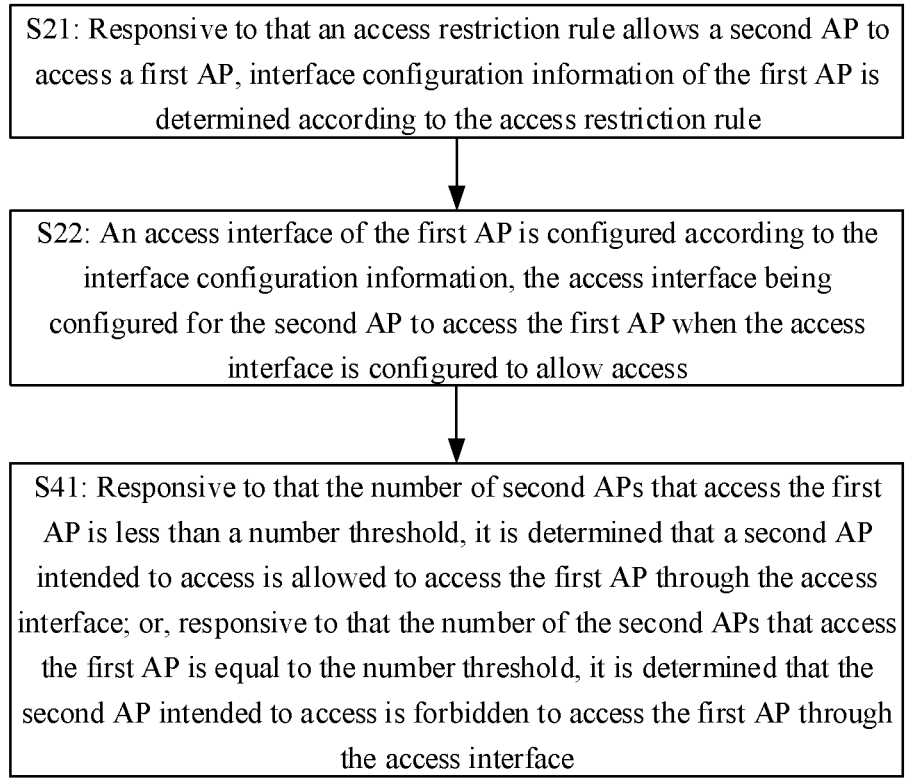
FIG. 4 is a flow chart showing an access method for an AP, according to an example.

As illustrated in FIG. 4, an embodiment provides an access method for an AP. The method is applied to a first AP, and includes the following operation.

At S41, responsive to that the number of second APs that access the first AP is less than a number threshold, it is determined that a second AP intended to access is allowed to access the first AP through the access interface; or, responsive to that the number of the second APs that access the first AP is equal to the number threshold, it is determined that the second AP intended to access is forbidden to access the first AP through the access interface.

In an embodiment, the first AP activates the access interface, the first AP receives the request message of requesting for accessing the first AP sent from the second AP intended to access, the first AP allows the second AP intended to access to access the first AP through the access interface responsive to that the number of the second APs that are connected to the first AP is less than the number threshold, and the first AP sends a notification message indicating that access is allowed to the second AP intended to access according to the request message. In such case, the second AP intended to access may access the first AP through the access interface after receiving the notification message.

In an embodiment, the first AP activates the access interface, the first AP receives the request message of requesting for accessing the first AP from the second AP intended to access, the first AP forbids the second AP intended to access to access the first AP through the access interface responsive to that the number of the second APs that are connected to the first AP is equal to the number threshold, and the first AP sends a notification message indicating that access is forbidden to the second AP intended to access according to the request message. In such case, the second AP intended to access may not access the first AP through the access interface after receiving the notification message.

It is to be noted that those skilled in the art can understand that the method provided in the embodiment of the disclosure may be executed independently, or may be executed together with some methods in the embodiments of the disclosure or some methods in the related art.

Figure 5:
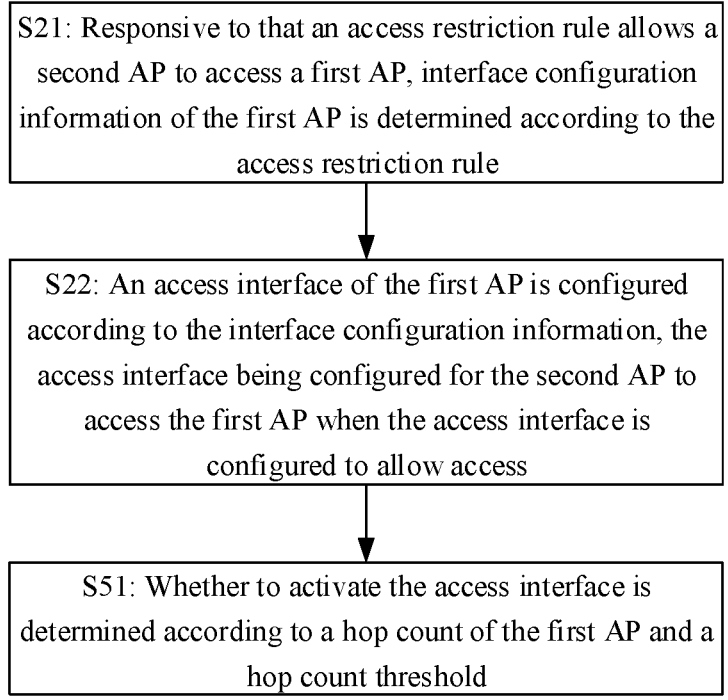
FIG. 5 is a flow chart showing an access method for an AP, according to an example.

As illustrated in FIG. 5, an embodiment provides an access method for an AP. The method is applied to a first AP, and includes the following operation.

At S51, whether to enable/activate the access interface is determined according to a hop count of the first AP and a hop count threshold.

In an embodiment, the access restriction rule sent by the root AP is received, or the access restriction rule is preset. The access restriction rule indicates the hop count threshold. In an embodiment, the same hop count threshold is configured for all APs in the mesh network.

In an embodiment, the hop count threshold may be the maximum hop count in the mesh network. For example, if the maximum hop count in the mesh network is N, the hop count threshold is N.

In an embodiment, the first AP determines to activate the access interface of the first AP responsive to that the hop count of the first AP is less than the hop count threshold, and in such case, the second AP intended to access may access the first AP through the access interface after the access interface is activated. The first AP determines to deactivate the access interface of the first AP responsive to that the hop count of the first AP is equal to the hop count threshold, and in such case, the second AP intended to access may not access the first AP through the access interface after the access interface is deactivated.

It is to be noted that those skilled in the art can understand that the method provided in the embodiment of the disclosure may be executed independently, or may be executed together with some methods in the embodiments of the disclosure or some methods in the related art.

Figure 6:
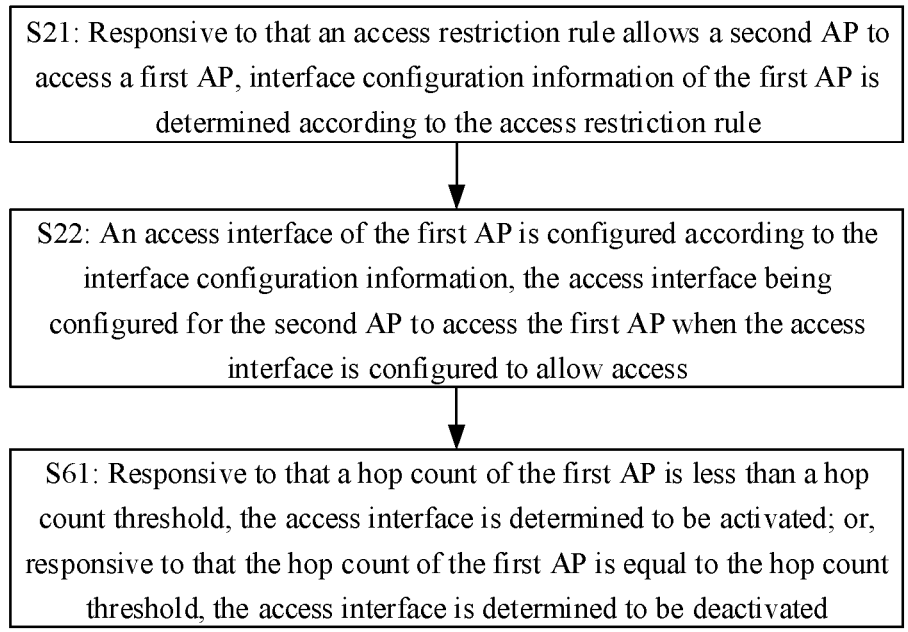
FIG. 6 is a flow chart showing an access method for an AP, according to an example.

As illustrated in FIG. 6, an embodiment provides an access method for an AP. The method is applied to a first AP, and includes the following operation.

At S61, responsive to that a hop count of the first AP is less than a hop count threshold, the access interface is determined to be activated; or, responsive to that the hop count of the first AP is equal to the hop count threshold, the access interface is determined to be deactivated.

In an embodiment, the access interface is determined to be activated responsive to that the hop count of the first AP is less than the hop count threshold, the first AP receives the request message of requesting for accessing the first AP from the second AP intended to access, the first AP allows the second AP intended to access to access the first AP through the access interface responsive to that the number of the second APs that are connected to the first AP is less than the number threshold, and the first AP sends a notification message indicating that access is allowed to the second AP intended to access according to the request message. In such case, the second AP intended to access may access the first AP through the access interface after receiving the notification message.

In an embodiment, the access interface is determined to be activated responsive to that the hop count of the first AP is less than the hop count threshold, the first AP receives the request message of requesting for accessing the first AP from the second AP intended to access, the first AP forbids the second AP intended to access to access the first AP through the access interface responsive to that the number of the second APs that are connected to the first AP is equal to the number threshold, and the first AP sends a notification message indicating that access is forbidden to the second AP intended to access according to the request message. In such case, the second AP intended to access may not access the first AP through the access interface after receiving the notification message.

In an embodiment, the access interface is determined to be deactivated responsive to that the hop count of the first AP is equal to the hop count threshold. The second AP intended to access may not access the first AP through the access interface responsive to that the access interface is deactivated.

It is to be noted that those skilled in the art can understand that the method provided in the embodiment of the disclosure may be executed independently, or may be executed together with some methods in the embodiments of the disclosure or some methods in the related art.

Figure 7:
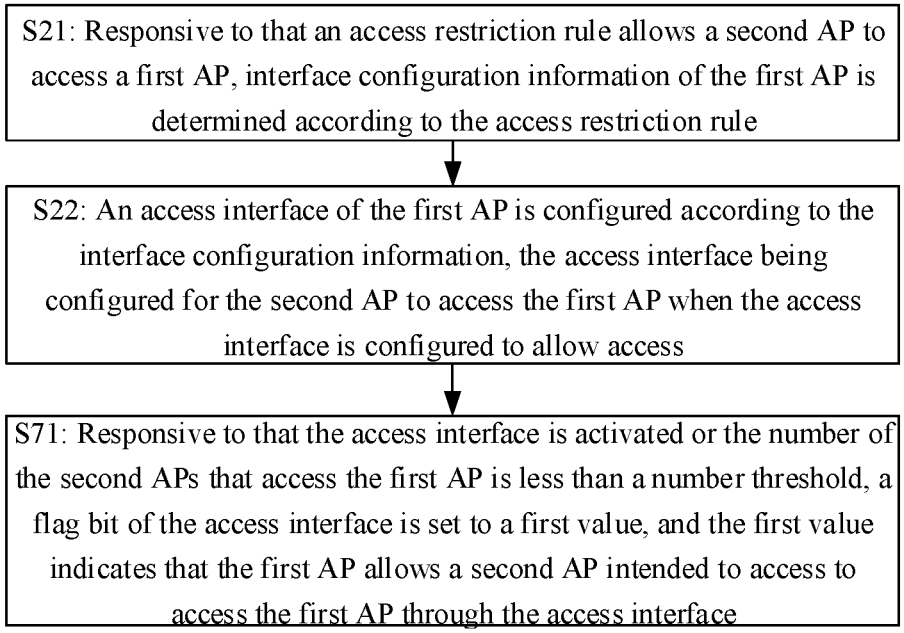
FIG. 7 is a flow chart showing an access method for an AP, according to an example.

As illustrated in FIG. 7, an embodiment provides an access method for an AP. The method is applied to a first AP, and includes the following operations.

At S71, responsive to that the access interface is activated or the number of the second APs that access the first AP is less than a number threshold, a flag bit of the access interface is set to a first value. The first value indicates that the first AP allows a second AP intended to access to access the first AP through the access interface.

In an embodiment, the flag bit is preset. For example, the flag bit limit is preset in a cache region.

In an embodiment, the flag bit of the access interface is set to the first value responsive to that the access interface is activated. For example, during initial setting, if the access interface of the AP is activated, the flag bit limit corresponding to the access interface may be set to be false.

In an embodiment, the flag bit of the access interface is set to the first value responsive to that the access interface is activated or the number of the second APs that access the first AP is less than the number threshold. For example, the first AP may set the flag bit limit corresponding to the access interface to be false when detecting that the number of the second APs that access the first AP is less than the number threshold.

In an embodiment, the first AP may detect the flag bit periodically. When the flag bit is false, the first AP allows the second AP intended to access to access the first AP through the access interface. Then, the second AP intended to access may access the first AP through the access interface.

It is to be noted that those skilled in the art can understand that the method provided in the embodiment of the disclosure may be executed independently, or may be executed together with some methods in the embodiments of the disclosure or some methods in the related art.

Figure 8:
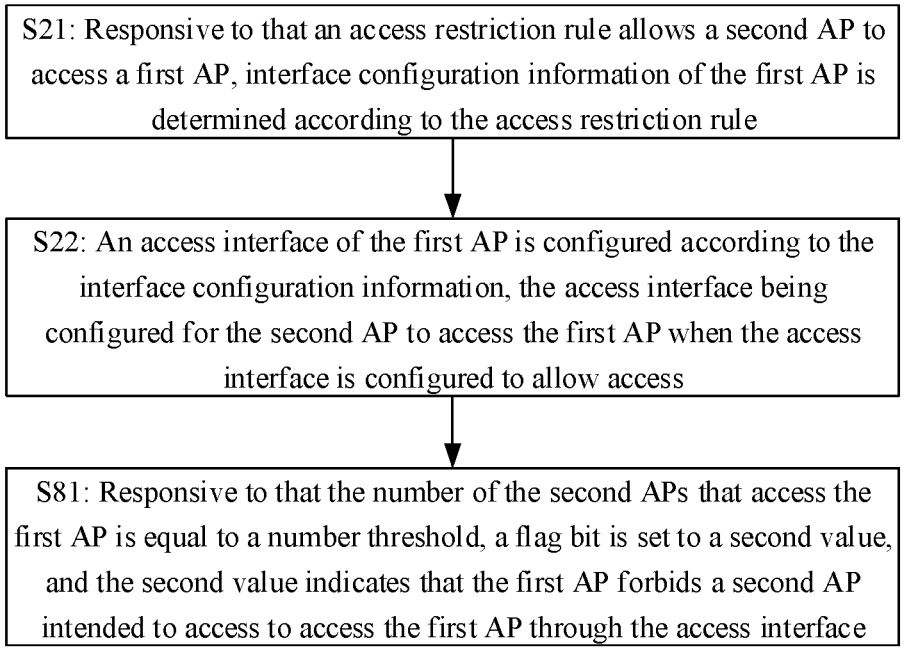
FIG. 8 is a flow chart showing an access method for an AP, according to an example.

As illustrated in FIG. 8, an embodiment provides an access method for an AP. The method is applied to a first AP, and includes the following operations.

At S81, responsive to that the number of the second APs that access the first AP is equal to a number threshold, a flag bit is set to a second value. The second value indicates that the first AP forbids a second AP intended to access to access the first AP through the access interface.

In an embodiment, the flag bit is preset. For example, the flag bit limit is preset in the cache region.

In an embodiment, the flag bit is set to the second value responsive to that the number of the second APs that access the first AP is equal to the number threshold. For example, the first AP may set the flag bit limit corresponding to the access interface to be true when detecting that the number of the second APs that access the first AP is equal to the number threshold.

In an embodiment, the first AP may detect the flag bit periodically. When the flag bit is true, the first AP forbids the second AP intended to access to access the first AP through the access interface. Then, the second AP intended to access may not access the first AP through the access interface.

It is to be noted that, when part of second APs that access the first AP are disconnected, the number of the second APs that access the first AP may be less than the number threshold, and in such case, the flag bit may be reset to be false.

It is to be noted that those skilled in the art can understand that the method provided in the embodiment of the disclosure may be executed independently, or may be executed together with some methods in the embodiments of the disclosure or some methods in the related art.

Figure 9:
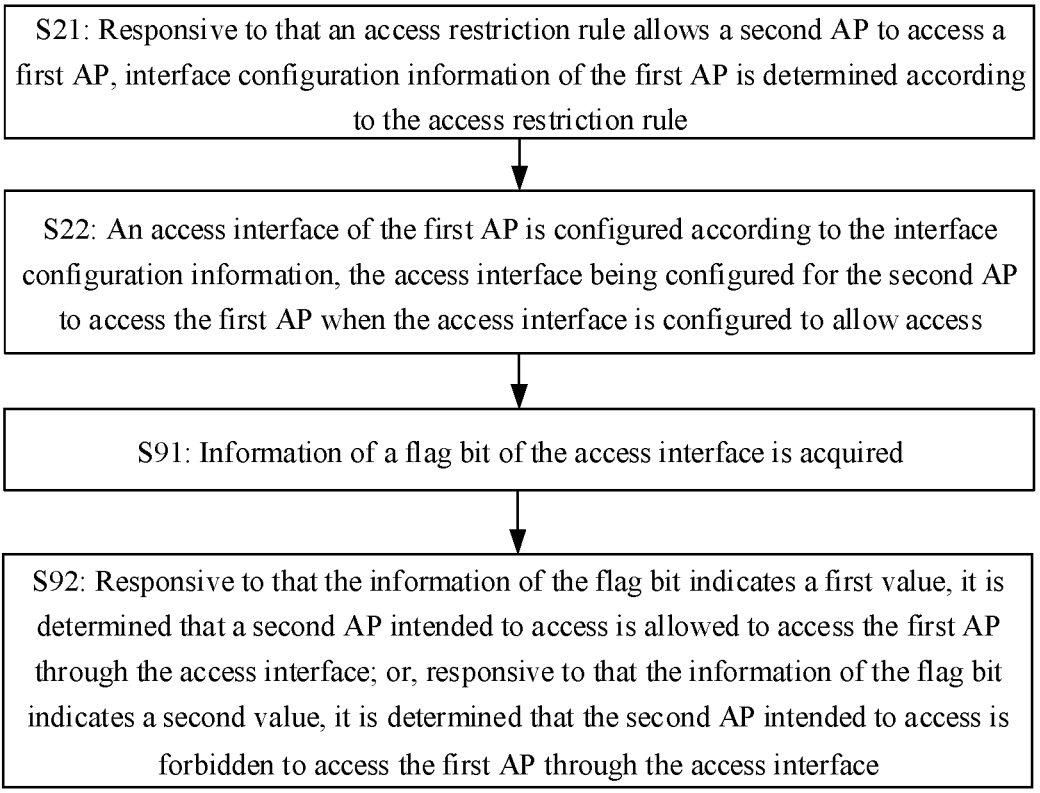
FIG. 9 is a flow chart showing an access method for an AP, according to an example.

As illustrated in FIG. 9, an embodiment provides an access method for an AP. The method is applied to a first AP, and includes the following operations.

At S91, information of a flag bit of the access interface is acquired.

At S92, responsive to that the information of the flag bit indicates a first value, it is determined that a second AP intended to access is allowed to access the first AP through the access interface; or, responsive to that the information of the flag bit indicates a second value, it is determined that the second AP intended to access is forbidden to access the first AP through the access interface.

In an embodiment, the information of the flag bit of the access interface may be acquired periodically.

In another embodiment, the information of the flag bit of the access interface may be acquired after the request message of requesting for access is received from the second AP intended to access.

In an embodiment, the first AP may detect the flag bit periodically. When the flag bit is false, the first AP allows the second AP intended to access to access the first AP through the access interface. Then, the second AP intended to access may access the first AP through the access interface.

In an embodiment, the first AP may detect the flag bit periodically. When the flag bit is true, the first AP forbids the second AP intended to access to access the first AP through the access interface. Then, the second AP intended to access may not access the first AP through the access interface.

It is to be noted that those skilled in the art can understand that the method provided in the embodiment of the disclosure may be executed independently, or may be executed together with some methods in the embodiments of the disclosure or some methods in the related art.

Figure 10:
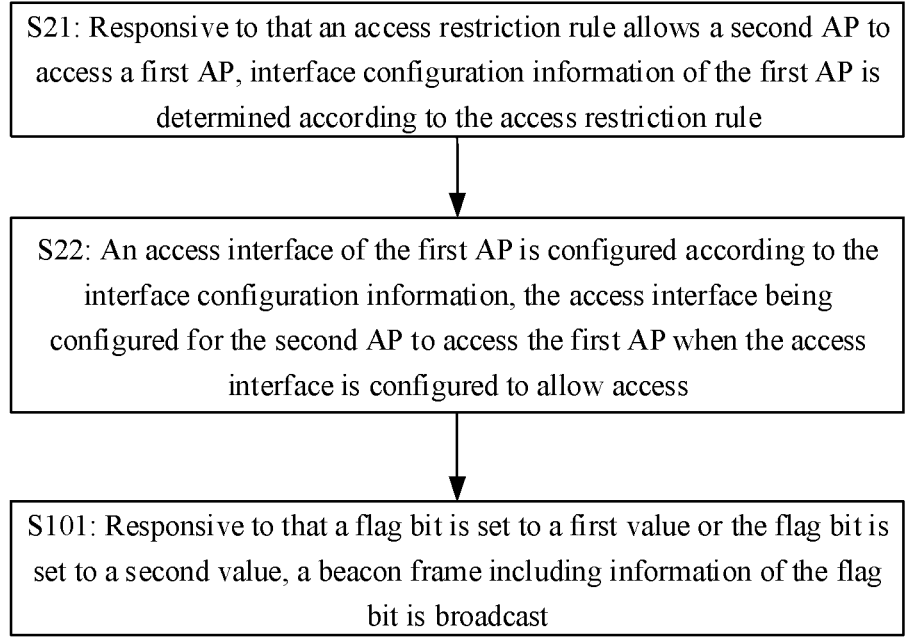
FIG. 10 is a flow chart showing an access method for an AP, according to an example.

As illustrated in FIG. 10, an embodiment provides an access method for an AP. The method is applied to a first AP, and includes the following operation.

At S101, responsive to that a flag bit is set to a first value or the flag bit is set to a second value, a beacon frame including information of the flag bit is broadcast.

In an embodiment, the beacon frame including the information of the flag bit is broadcast responsive to that the flag bit is set to the first value during initial setting.

In an embodiment, the beacon frame including the information of the flag bit is broadcast responsive to that the flag bit is updated from the first value to the second value.

In an embodiment, the first AP allows the second AP intended to access to access the first AP through the access interface responsive to that the beacon frame includes the first value; and the first AP forbids the second AP intended to access to access the first AP through the access interface responsive to that the beacon frame includes the second value. Then, the second AP may access or stop accessing the first AP according to an instruction of the first AP.

It is to be noted that those skilled in the art can understand that the method provided in the embodiment of the disclosure may be executed independently, or may be executed together with some methods in the embodiments of the disclosure or some methods in the related art.

For understanding the embodiments of the disclosure better, the embodiments of the disclosure will further be described below through examples.

Figure 11:
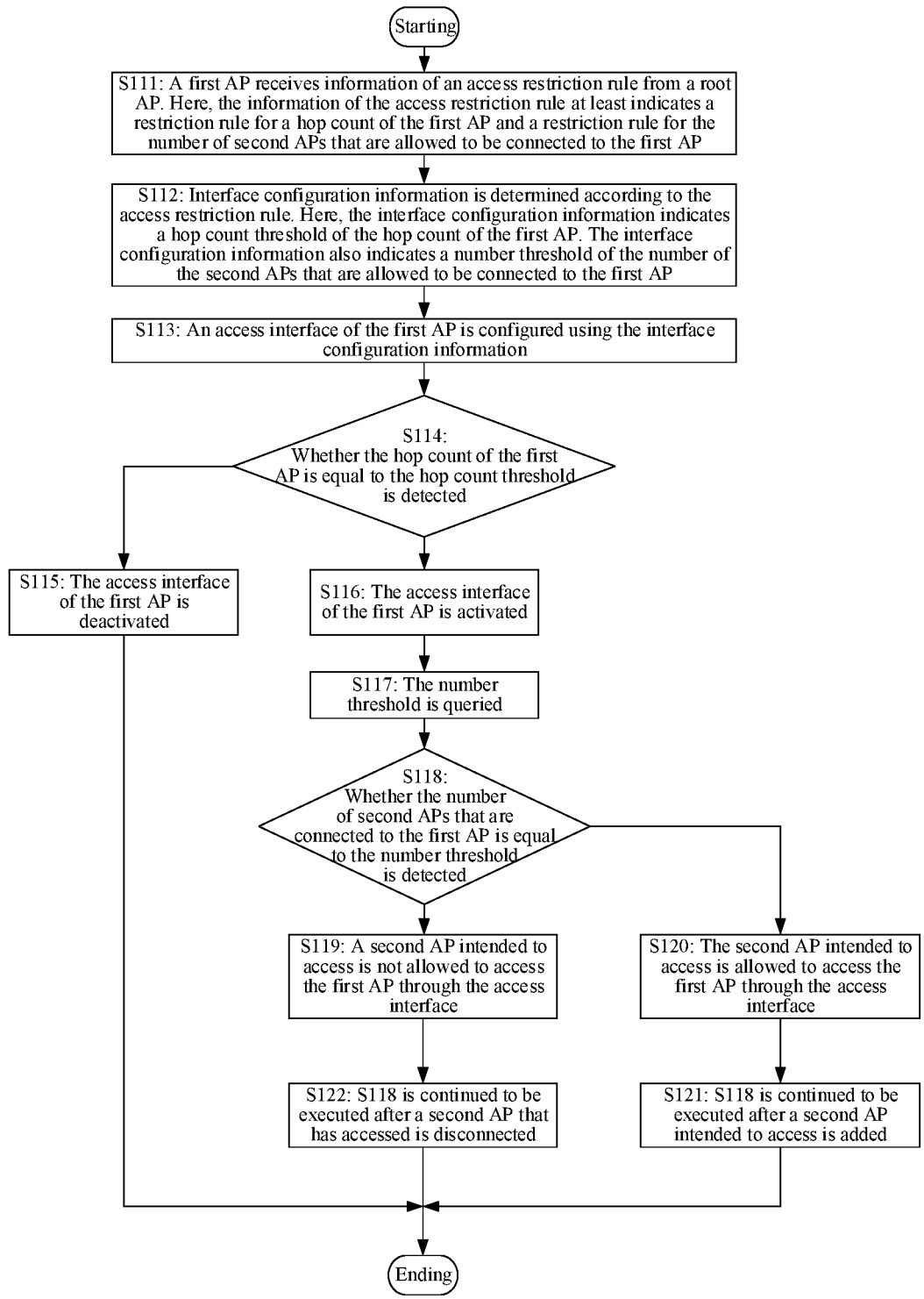
FIG. 11 is a flow chart showing an access method for an AP, according to an example.

Referring to FIG. 11, an access method for an AP is provided. The method is applied to a first AP, and includes the following operations.

At S111, the first AP receives information of an access restriction rule from a root AP. Here, the information of the access restriction rule at least indicates a restriction rule for a hop count of the first AP and a restriction rule for the number of second APs that are allowed to be connected to the first AP.

At S112, interface configuration information is determined according to the access restriction rule. Here, the interface configuration information indicates a hop count threshold of the hop count of the first AP. The interface configuration information also indicates a number threshold of the number of the second APs that are allowed to be connected to the first AP.

At S113, an access interface of the first AP is configured using the interface configuration information.

At S114, whether the hop count of the first AP is equal to the hop count threshold is detected, S115 is executed when the hop count of the first AP is equal to the hop count threshold, otherwise, S116 is executed.

At S115, the access interface of the first AP is deactivated.

At S116, the access interface of the first AP is activated.

At S117, the number threshold is queried.

At S118, whether the number of second APs that are connected to the first AP is equal to the number threshold is detected, S119 is executed when the number of the second APs that are connected to the first AP is equal to the number threshold, otherwise, S120 is executed.

At S119, a second AP intended to access is not allowed to access the first AP through the access interface, and S122 is executed.

At S120, the second AP intended to access is allowed to access the first AP through the access interface.

At S121, S118 is continued to be executed after a second AP intended to access is added.

At S122, S118 is continued to be executed after a second AP that has accessed is disconnected.

Figure 12:
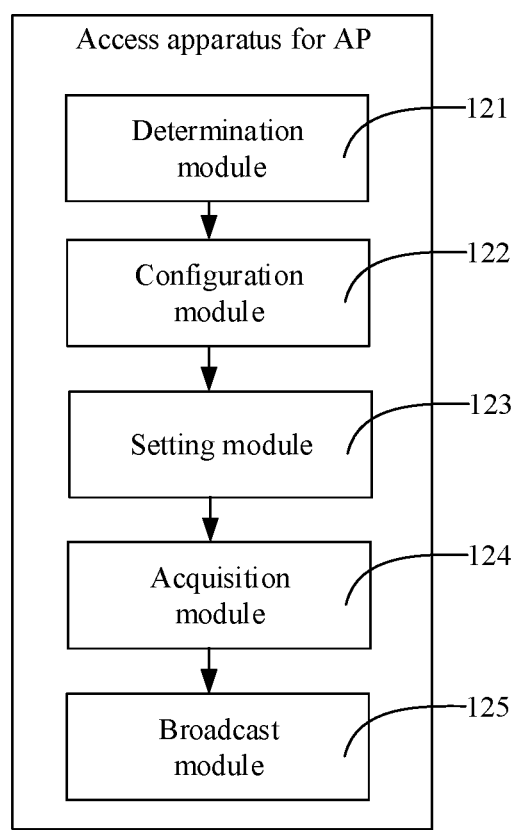
FIG. 12 is a block diagram of an access apparatus for an AP, according to an example.

As illustrated in FIG. 12, an embodiment provides an access apparatus for an AP. The apparatus is applied to a first AP, and includes a determination module 121 and a configuration module 122.

The determination module 121 is configured to, responsive to that an access restriction rule allows a second AP to access the first AP, determine interface configuration information of the first AP according to the access restriction rule.

The configuration module 122 is configured to configure an access interface of the first AP according to the interface configuration information, the access interface being configured for the second AP to access the first AP when the access interface is configured to allow access.

In an embodiment, the determination module 121 is further configured as follows: the interface configuration information includes at least one of: first interface configuration information, indicating a number threshold of the number of second APs that are allowed to access the first AP using the access interface; or second interface configuration information, indicating a hop count threshold of a hop count of the AP.

In an embodiment, the determination module 121 is further configured to: determine whether a second AP intended to access is allowed to access the first AP through the access interface according to the number of the second APs that access the first AP and a number threshold.

In an embodiment, the determination module 121 is further configured to: responsive to that the number of second APs that access the first AP is less than a number threshold, determine that a second AP intended to access is allowed to access the first AP through the access interface; or, responsive to that the number of the second APs that access the first AP is equal to the number threshold, determine that the second AP intended to access is forbidden to access the first AP through the access interface.

In an embodiment, the determination module 121 is further configured to: determine whether to activate the access interface according to a hop count of the first AP and a hop count threshold.

In an embodiment, the determination module 121 is further configured to: responsive to that a hop count of the first AP is less than a hop count threshold, determine to activate the access interface; or, responsive to that the hop count of the first AP is equal to the hop count threshold, determine to deactivate the access interface.

In an embodiment, the apparatus further includes a setting module 123. The setting module 123 is further configured to: responsive to that the access interface is activated or the number of the second APs that access the first AP is less than a number threshold, set a flag bit of the access interface to a first value; and the first value indicates that the first AP allows a second AP intended to access to access the first AP through the access interface.

In an embodiment, the setting module 123 is further configured to: responsive to that the number of the second APs that access the first AP is equal to a number threshold, set a flag bit to a second value; and the second value indicates that the first AP forbids a second AP intended to access to access the first AP through the access interface.

In an embodiment, the apparatus further includes an acquisition module 124.

The acquisition module 124 is further configured to acquire information of a flag bit of the access interface; and the determination module 121 is further configured to: responsive to that the information of the flag bit indicates a first value, determine that a second AP intended to access is allowed to access the first AP through the access interface; or, responsive to that the information of the flag bit indicates a second value, determine that the second AP intended to access is forbidden to access the first AP through the access interface.

In an embodiment, the apparatus further includes a broadcast module 125. The broadcast module 125 is configured to: responsive to that a flag bit is set to a first value or the flag bit is set to a second value, broadcast a beacon frame including information of the flag bit.

With respect to the apparatuses in the above embodiments, the specific manners for performing operations for individual modules therein have been described in detail in the embodiments regarding the methods, which will not be elaborated herein.

An embodiment of the disclosure also provides a communication device, which includes: an antenna; a memory; and a processor, connected with the antenna and the memory respectively and configured to execute an executable program stored in the memory to control the antenna to send and receive wireless signals and execute the steps of the wireless network access method provided in any abovementioned embodiment.

The communication device provided in the embodiment may be the abovementioned terminal or base station. The terminal may be various carry-on terminals or vehicle-mounted terminals. The base station may be various types of base stations, for example, a 4th-generation (4G) base station, a 5th-generation (5G) base station or the like.

The antenna may be various types of antennae, such as a mobile antenna like a 3rd-generation (3G) antenna, a 4G antenna, a 5G antenna or the like. The antenna may also include a wireless fidelity (WiFi) antenna, a wireless charging antenna, etc.

The memory may include various types of storage media, and the storage medium is a non-transitory computer storage medium, and may keep information in the communication device after a power failure of the communication device.

The processor may be connected with the antenna and the memory through a bus, etc., and is configured to read the executable program stored in the memory to implement, for example, at least one of the methods in any embodiment of the disclosure.

An embodiment of the disclosure also provides a non-transitory computer-readable storage medium, which stores an executable program, the executable program being executed by a processor to implement the steps of the wireless network access method provided in any abovementioned embodiment, for example, at least one of the methods in any embodiment of the disclosure.

With respect to the apparatuses in the above embodiments, the specific manners for performing operations for individual modules therein have been described in detail in the embodiments regarding the methods, which will not be elaborated herein.

Figure 13:
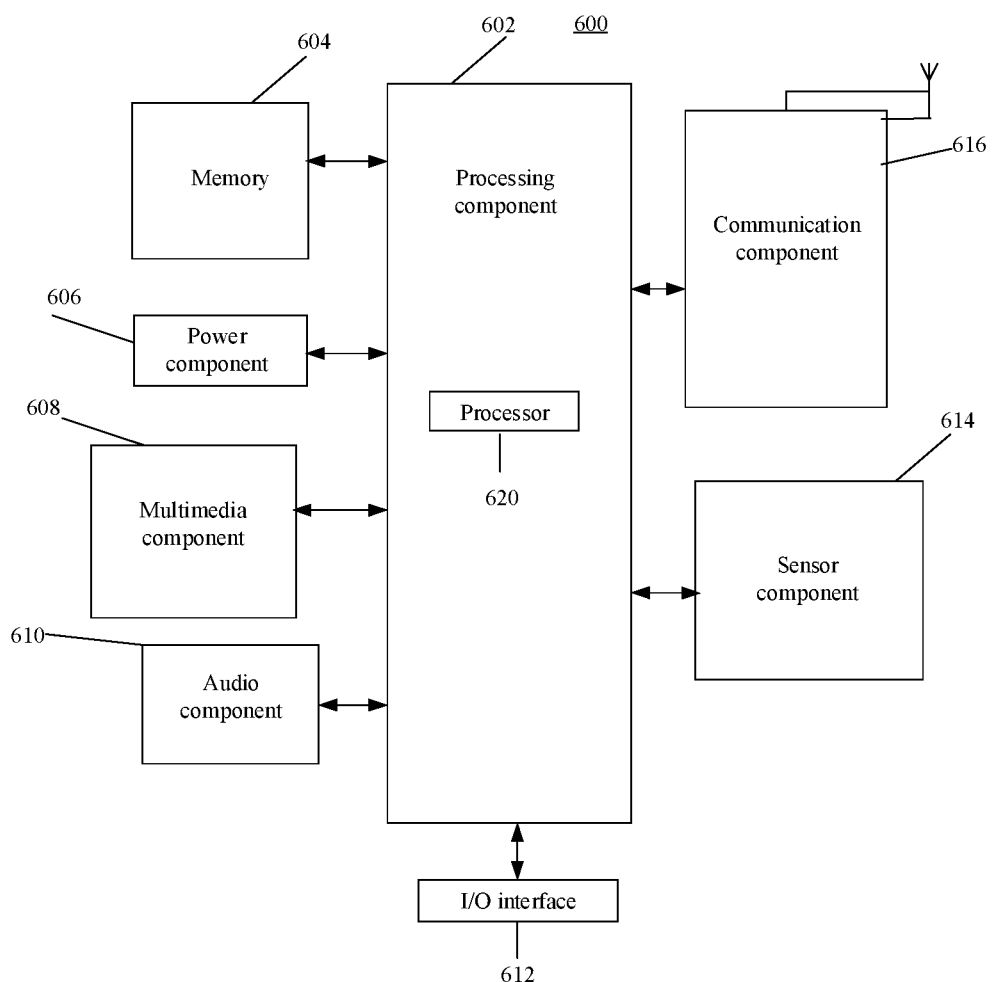
FIG. 13 is a block diagram of an electronic device, according to an example.

FIG. 13 is a block diagram of an electronic device 600, according to an example. For example, the electronic device 600 may be a mobile phone, a computer, a digital broadcast terminal, a messaging device, a gaming console, a tablet, a medical device, exercise equipment, a personal digital assistant, and the like.

Referring to FIG. 13, the electronic device 600 may include one or more of the following components: a processing component 602, a memory 604, a power component 606, a multimedia component 608, an audio component 610, an input/output (I/O) interface 612, a sensor component 614, or a communication component 616.

The processing component 602 typically controls overall operations of the electronic device 600, such as the operations associated with display, telephone calls, data communications, camera operations, and recording operations. The processing component 602 may include one or more processors 820 to execute instructions to perform all or part of the steps in the abovementioned method. Moreover, the processing component 602 may include one or more modules which facilitate interaction between the processing component 602 and other components. For instance, the processing component 602 may include a multimedia module to facilitate interaction between the multimedia component 608 and the processing component 602.

The memory 604 is configured to store various types of data to support the operation of the device 600. Examples of such data include instructions for any applications or methods operated on the electronic device 600, contact data, phonebook data, messages, pictures, video, etc. The memory 604 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 606 provides power for various components of the electronic device 600. The power component 606 may include a power management system, one or more power supplies, and other components associated with generation, management and distribution of power for the electronic device 600.

The multimedia component 608 includes a screen providing an output interface between the electronic device 600 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 608 includes a front camera and/or a rear camera. The front camera and/or the rear camera may receive external multimedia data when the device 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a microphone (MIC), and the MIC is configured to receive an external audio signal when the electronic device 600 is in an operation mode, such as a call mode, a recording mode and a voice recognition mode. The received audio signal may further be stored in the memory 604 or sent through the communication component 616. In some embodiments, the audio component 610 further includes a speaker configured to output the audio signal.

The I/O interface 612 provides an interface between the processing component 602 and peripheral interface modules, such as a keyboard, a click wheel, buttons and the like. The buttons may include, but are not limited to: a home button, a volume button, a starting button and a locking button.

The sensor component 614 includes one or more sensors configured to provide status assessments in various aspects for the electronic device 600. For instance, the sensor component 614 may detect an on/off status of the device 600 and relative positioning of components, such as a display and small keyboard of the electronic device 600, and the sensor component 614 may further detect a change in a position of the electronic device 600 or a component of the electronic device 600, presence or absence of contact between the user and the electronic device 600, orientation or acceleration/deceleration of the electronic device 600 and a change in temperature of the electronic device 600. The sensor component 614 may include a proximity sensor configured to detect presence of an object nearby without any physical contact. The sensor component 614 may also include a light sensor, such as a complementary metal oxide semiconductor (CMOS) or charge coupled device (CCD) image sensor, configured for use in an imaging application. In some embodiments, the sensor component 614 may also include an acceleration sensor, a gyroscope sensor, a magnetic sensor, a pressure sensor or a temperature sensor.

The communication component 616 is configured to facilitate wired or wireless communication between the electronic device 600 and other devices. The electronic device 600 may access a communication-standard-based wireless network, such as a WiFi network, a 2nd-generation (2G) or 3G network or a combination thereof. In an example, the communication component 616 receives a broadcast signal or broadcast associated information from an external broadcast management system through a broadcast channel. In an example, the communication component 616 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an example, the electronic device 600 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned methods.

In an example, there is also provided anon-transitory computer-readable storage medium including instructions, such as included in the memory 604, executable by the processor 820 of the electronic device 600 for performing the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

Other implementation solutions of the disclosure will be apparent to those skilled in the art from consideration of the specification and practice of the disclosure. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. An access method comprising:
   determining, by a first AP and responsive to determining that an access restriction rule allows a second AP to access the first AP, interface configuration information of the first AP according to the access restriction rule, wherein the interface configuration information comprises second interface configuration indicating a hop count threshold of a hop count of each AP, and the hop count threshold is a maximum hop count of a mesh network; and
   configuring, by the first AP, an access interface of the first AP according to the interface configuration information, the access interface being configured for the second AP to access the first AP in response to determining that the access interface is configured to allow access.

2. The method of claim 1, wherein the first AP is a root router of the mesh network, the second AP is a sub router of the mesh network, and the root router is connected with at least one sub router; or, the first AP is an intermediate sub router of the mesh network, the second AP is an end router of the mesh network, and the intermediate sub router is connected with at least one end router.

3. The method of claim 1, wherein the interface configuration information comprises:
   first interface configuration indicating a number threshold of a number of second APs allowed to access the first AP using the access interface.

4. The method of claim 3, further comprising:
determining whether a second AP intended to access is allowed to access the first AP through the access interface according to the number of the second APs that access the first AP and the number threshold.

5. The method of claim 4, wherein determining whether the second AP intended to access is allowed to access the first AP through the access interface according to the number of the second APs that access the first AP and the number threshold comprises:
determining that the second AP intended to access is allowed to access the first AP through the access interface responsive to determining that the number of the second APs that access the first AP is less than the number threshold; or
determining that the second AP intended to access is forbidden to access the first AP through the access interface responsive to determining that the number of the second APs that access the first AP is equal to the number threshold.

6. The method of claim 3, further comprising:
determining whether to activate the access interface according to the hop count of the first AP and the hop count threshold;
wherein determining whether to activate the access interface according to the hop count of the first AP and the hop count threshold comprises:
determining to activate the access interface responsive to determining that the hop count of the first AP is less than the hop count threshold; or
determining to deactivate the access interface responsive to determining that the hop count of the first AP is equal to the hop count threshold.

7. The method of claim 4, further comprising:
setting a flag bit of the access interface to a first value responsive to determining that the access interface is activated or the number of the second APs that access the first AP is less than the number threshold;
wherein the first value indicates that the first AP allows the second AP intended to access to access the first AP through the access interface.

8. The method of claim 7, further comprising:
setting the flag bit to a second value responsive to determining that the number of the second APs that access the first AP is equal to the number threshold;
wherein the second value indicates that the first AP forbids the second AP intended to access to access the first AP through the access interface.

9. The method of claim 8, further comprising:
acquiring information of the flag bit of the access interface;
wherein determining whether the second AP intended to access is allowed to access the first AP through the access interface according to the number of the second APs that access the first AP and the number threshold comprises:
determining that the second AP intended to access is allowed to access the first AP through the access interface responsive to determining that the information of the flag bit indicates the first value; or
determining that the second AP intended to access is forbidden to access the first AP through the access interface responsive to determining that the information of the flag bit indicates the second value.

10. The method of claim 8, further comprising:
broadcasting a beacon frame including information of the flag bit responsive to determining that the flag bit is set to the first value or the flag bit is set to the second value.

11. An access apparatus for a first access point (AP), comprising:
a processor; and
a memory for storing instructions executable by the processor;
wherein the processor is configured to:
determine, responsive to determining that an access restriction rule allows a second AP to access a first AP, interface configuration information of the first AP according to the access restriction rule, wherein the interface configuration information comprises second interface configuration indicating a hop count threshold of a hop count of each AP, and the hop count threshold is a maximum hop count of a mesh network; and
configure an access interface of the first AP according to the interface configuration information, the access interface being configured for the second AP to access the first AP in response to determining that the access interface is configured to allow access.

12. The apparatus of claim 11, wherein the first AP is a root router of the mesh network, the second AP is a sub router of the mesh network, and the root router is connected with at least one sub router; or, the first AP is an intermediate sub router of the mesh network, the second AP is an end router of the mesh network, and the intermediate sub router is connected with at least one end router.

13. The apparatus of claim 11, wherein the interface configuration information comprises:
first interface configuration indicating a number threshold of a number of second APs allowed to access the first AP using the access interface.

14. The apparatus of claim 13, wherein the processor is further configured to:
determine whether a second AP intended to access is allowed to access the first AP through the access interface according to the number of the second APs that access the first AP and the number threshold.

15. The apparatus of claim 14, wherein the processor is further configured to:
responsive to determining that the number of the second APs that access the first AP is less than the number threshold, determine that the second AP intended to access is allowed to access the first AP through the access interface; or
responsive to determining that the number of the second APs that access the first AP is equal to the number threshold, determine that the second AP intended to access is forbidden to access the first AP through the access interface.

16. The apparatus of claim 13, wherein the processor is further configured to:
determine whether to activate the access interface according to the hop count of the first AP and the hop count threshold;
wherein the processor is further configured to:
responsive to determining that the hop count of the first AP is less than the hop count threshold, determine to activate the access interface; or
responsive to determining that the hop count of the first AP is equal to the hop count threshold, determine to deactivate the access interface.

17. The apparatus of claim 14, wherein the processor is further configured to:
  responsive to determining that the access interface is activated or the number of the second APs that access the first AP is less than the number threshold, set a flag bit of the access interface to a first value;
  wherein the first value indicates that the first AP allows the second AP intended to access to access the first AP through the access interface.

18. The apparatus of claim 17, wherein the processor is further configured to:
  responsive to determining that the number of the second APs that access the first AP is equal to the number threshold, set the flag bit to a second value;
  wherein the second value indicates that the first AP forbids the second AP intended to access to access the first AP through the access interface.

19. The apparatus of claim 18, wherein the processor is further configured to acquire information of the flag bit of the access interface; and
  wherein the processor is further configured to:
  responsive to determining that the information of the flag bit indicates the first value, determine that the second AP intended to access is allowed to access the first AP through the access interface; or
  responsive to determining that the information of the flag bit indicates the second value, determine that the second AP intended to access is forbidden to access the first AP through the access interface.

20. The apparatus of claim 18, wherein the processor is further configured to:
  responsive to determining that the flag bit is set to the first value or the flag bit is set to the second value, broadcast a beacon frame including information of the flag bit.

* * * * *